(12) United States Patent
Kagaya

(10) Patent No.: US 6,567,458 B1
(45) Date of Patent: *May 20, 2003

(54) WIRELESS COMMUNICATION SYSTEM UTILIZING FREQUENCY HOPPING METHOD AND CONTROL METHOD THEREFOR

(75) Inventor: Naoto Kagaya, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/923,974

(22) Filed: Sep. 5, 1997

(30) Foreign Application Priority Data

Sep. 10, 1996 (JP) .............................. 8-261479

(51) Int. Cl.[7] .............................. H04L 27/30
(52) U.S. Cl. .................. 375/132; 375/130; 375/133; 375/260; 455/464; 455/509
(58) Field of Search ................ 455/507, 517, 455/464, 463, 509; 375/132, 133, 134, 135, 136, 137, 259, 260, 130; 379/215; 340/825.5, 825.51

(56) References Cited

U.S. PATENT DOCUMENTS

| 5,463,659 | A | * | 10/1995 | Nealon et al. | 375/202 |
| 5,583,866 | A | * | 12/1996 | Vook et al. | 370/312 |
| 5,748,621 | A | | 5/1998 | Masuda et al. | 370/337 |
| 5,822,361 | A | * | 10/1998 | Nakamura et al. | 375/202 |
| 5,862,142 | A | * | 1/1999 | Takiyasu et al. | 370/480 |
| 5,870,391 | A | * | 2/1999 | Nago | 370/330 |
| 5,923,702 | A | * | 7/1999 | Brenner et al. | 375/202 |
| 5,940,489 | A | * | 8/1999 | Cohn et al. | 379/215 |
| 6,032,049 | A | * | 2/2000 | Izumi | 455/509 |

FOREIGN PATENT DOCUMENTS

JP          8-251281          9/1996

* cited by examiner

Primary Examiner—Shuwang Liu
(74) Attorney, Agent, or Firm—Fitzpatrick, Cella, Harper & Scinto

(57) ABSTRACT

In a wireless communication system capable of communication with a frequency hopping method, if predetermined control information is received from a third wireless communication device while a first wireless communication device is in communication with a second wireless communication device, the first wireless communication device interrupts the communication with the second wireless communication device and executes communication with the third wireless communication device. When the communication between the first and third wireless communication devices is terminated, the communication with the second wireless communication device is re-started. All these communications are executed in a same hopping pattern, and the second wireless communication device switches the frequency according to such hopping pattern even while the communication is interrupted.

36 Claims, 11 Drawing Sheets

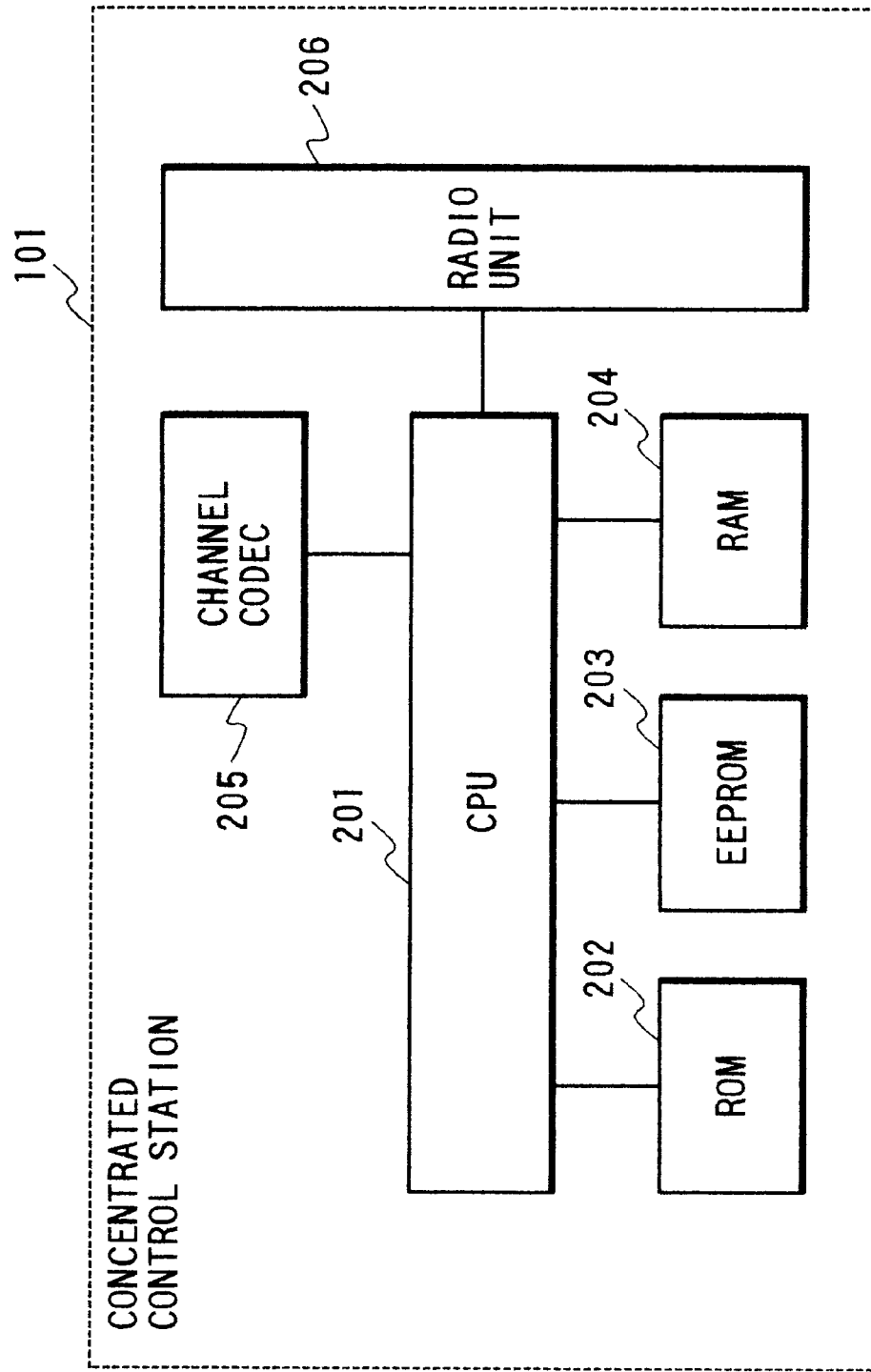

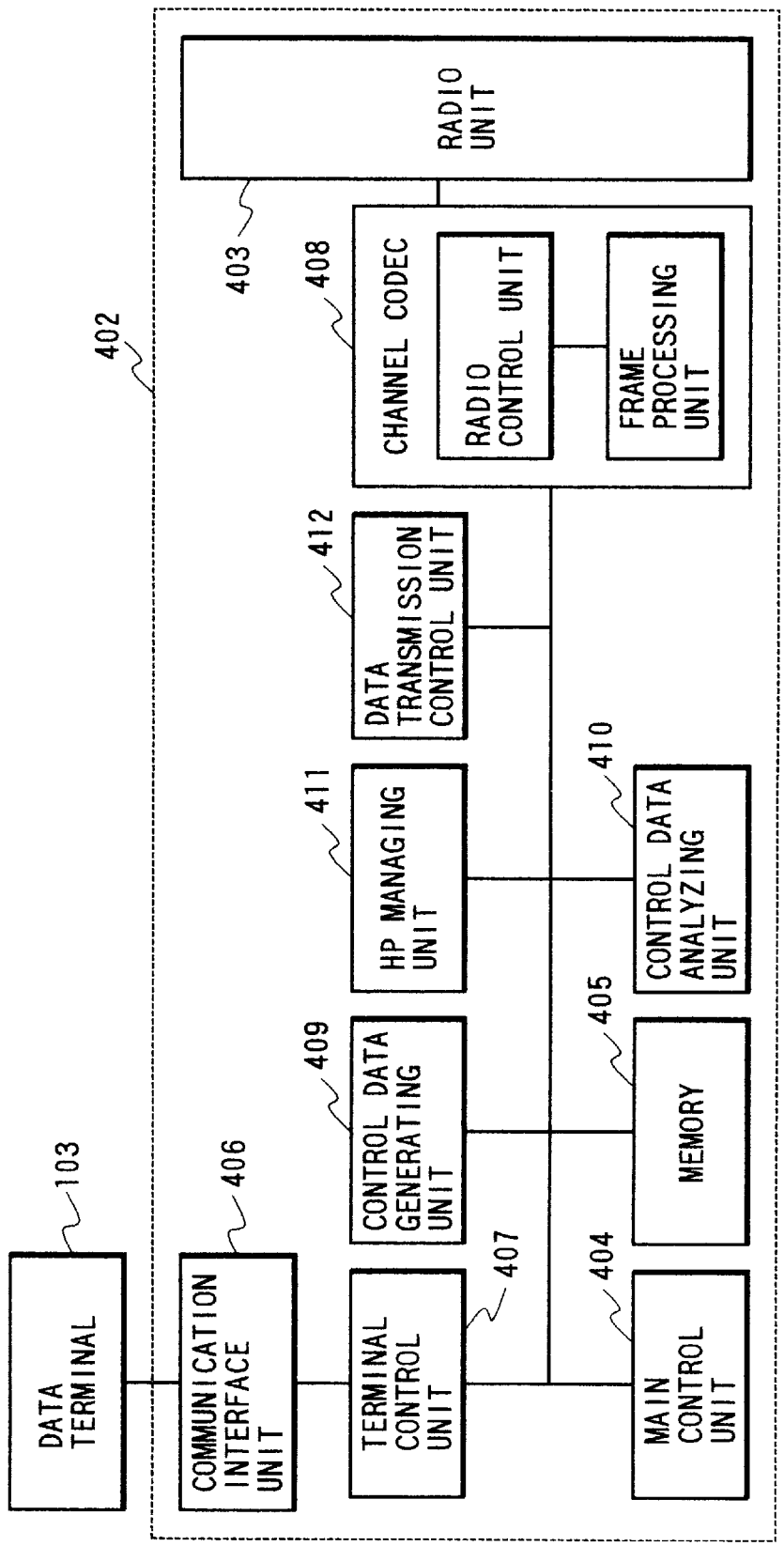

(1) FRAME STRUCTURE (2) SYSTEM CONTROL CHANNEL (CNT) FRAME (3) LOGIC CONTROL CHANNEL (LCCH) FRAME (4) DATA CHANNEL FRAME (5) DATA FRAME (6) CONTROL DATA FRAME (7) VOICE CHANNEL FRAME (8) END FRAME

WIRELESS COMMUNICATION SYSTEM UTILIZING FREQUENCY HOPPING METHOD AND CONTROL METHOD THEREFOR

BACKGROUND OF THE INVENTION

1. Field of the Invention

The present invention relates to a wireless communication system utilizing a frequency hopping method and a control method therefor.

2. Related Background Art

Wireless communication has recently shown remarkable progress and is being utilized in various fields. In particular, there are being proposed wireless systems for effecting the multimedia data communication.

In such wireless exchange systems, digital wireless communication methods are increasingly utilized. Among such digital wireless communication methods, spread spectrum (SS) communication is attracting particular attention. The spread spectrum communication is based on spreading the transmitted information over a wide band and is known to be splendid in the ability of eliminating disturbance and maintaining the privacy of communication. The spread spectrum communication is getting popularity through the world and a frequency band of 2.4 GHz is assigned for this purpose in various countries.

The spread spectrum communication can be roughly divided into a frequency hopping (FH) method and a direct spreading (DS) method. The former utilizes the wide frequency band by varying the modulating frequency within a predetermined time, while the latter effects spread modulation of the transmitted information with a pseudo noise code of a speed of ten to several hundred times.

In the spread spectrum communication of the frequency hopping method, plural communications can be achieved simultaneously by selecting the form of variation, or the hopping pattern (HP), of the modulating frequency. More specifically, multiplexed communications can be realized within a same time, by adopting different hopping patterns in the different communication terminals.

In such conventional system, therefore, a key terminal constituting a central control station manages the hopping patterns within the system, and any terminal executes communication with the hopping pattern obtained from such central control station.

However such conventional system has been associated with the following drawbacks.

During a communication between a first terminal and a second terminal, a third terminal, wishing to send an urgent message or data to the first or second terminal, is unable to do so by cutting into the communication because the hopping pattern (HP) used by the first and second terminals in the communication.

SUMMARY OF THE INVENTION

An object of the present invention is to enable, during a communication between a first terminal and a second terminal by the frequency hopping method, a third terminal to communicate with the first or second terminal.

Another object of the present invention is to enable a third terminal to cut into a communication between a first terminal and a second terminal, and, after a communication between the third terminal and the first or second terminal, to promptly restore the communication between the first and second terminals.

Still another object of the present invention is to enable a third terminal to cut into a communication between a first terminal and a second terminal, and, after a communication between the third terminal and the first or second terminal, to simply restore the communication between the first and second terminals without re-assignment of the hopping pattern.

Still another object of the present invention is, in case a third terminal cutting into a communication between a first terminal and a second terminal, to avoid collision of the data transmitted by the third terminal with the data communicated between the first and second terminals.

Still other objects of the present invention, and the features thereof, will become fully apparent from the following description which is to be taken in conjunction with the attached drawings.

BRIEF DESCRIPTION OF THE DRAWINGS

FIG. 2 is a block diagram showing the configuration of a concentrated control station 101 in the embodiment of the present invention;

FIG. 3 is a block diagram showing the configuration of a wireless adapter 402 connected to a data terminal 103 in the embodiment of the present invention;

DESCRIPTION OF THE PREFERRED EMBODIMENTS

First Embodiment

The present embodiment shows a case of utilizing digital wireless communication by the frequency hopping method in the internal line transfer in an exchange system.

[System Configuration]

Figure 1:
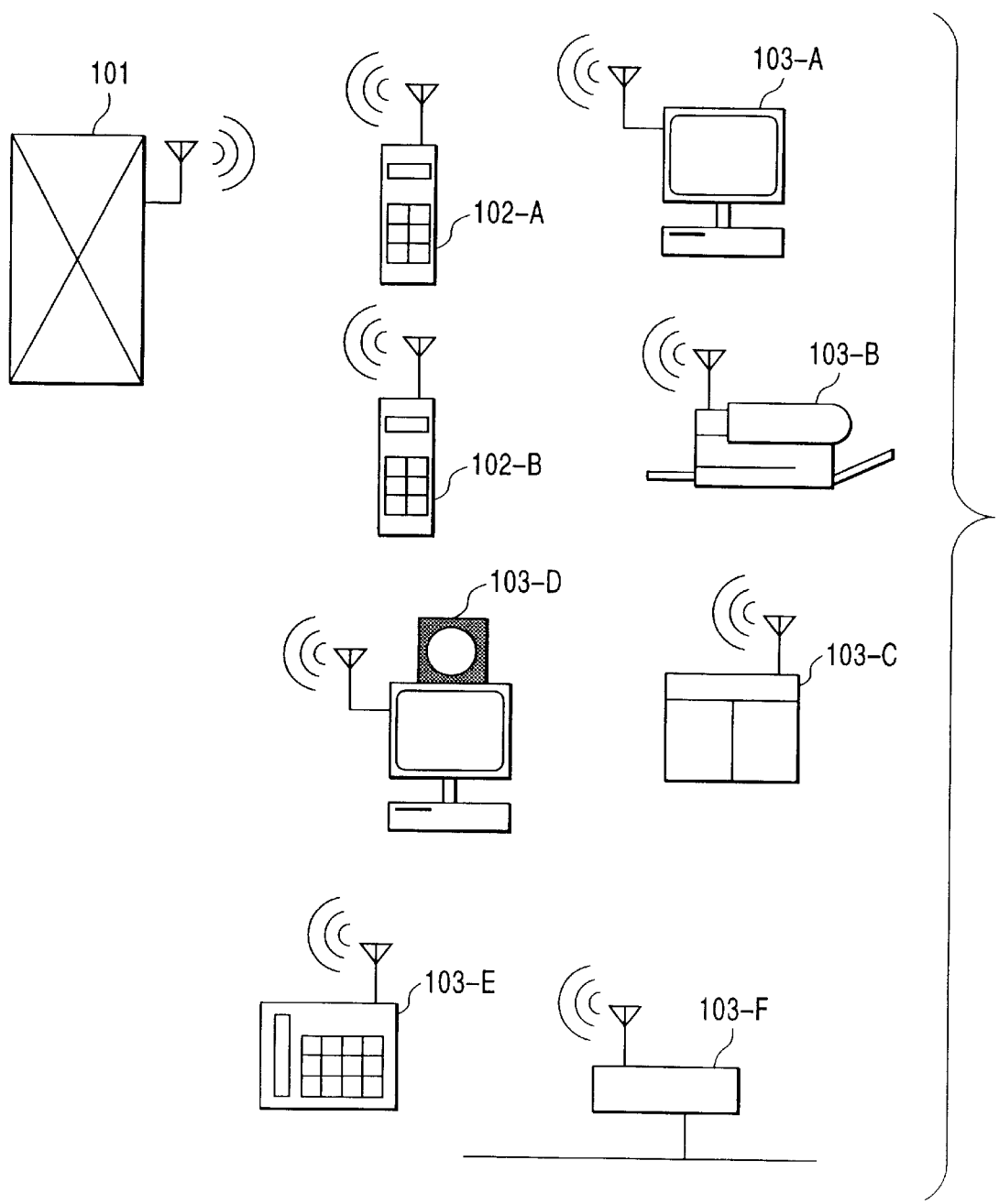
FIG. 1 is a schematic view showing the configuration of a system conceived in the embodiment of the present invention.

FIG. 1 is a schematic view showing the configuration of a system conceived in the present embodiment.

The present system is composed of a concentrated control station 101 having a wireless connecting function between the wireless terminal units; plural wireless telephone units 102-A, 102-B for effecting communication of control data and voice data; and data terminal units 103-A to 103-F for effecting communication of the control data and direct data communication among the terminals.

In the present embodiment, the data terminal unit is defined as "the combination of a terminal capable of transmitting data of an arbitrary amount in burst manner (data terminal) and a wireless adapter for effecting the wireless communication between such data terminals", and the data terminal is not limited to a computer 103-A but can also be a printer 103-B, a copying apparatus 103-C, a television conference terminal 103-D, a facsimile apparatus 103-E, a LAN bridge 103-F or other various terminals capable of data processing such as an electronic camera, a video camera or a scanner.

[Configuration of Concentrated Control Station]

FIG. 2 is a block diagram showing the configuration of the concentrated control station 101.

A CPU 201 constitutes the nucleus of the concentrated control station 101 and executes the control of the entire concentrated control station 101, including the communication channel control and the control of the wireless units. A ROM 202 stores, for example, the control program of the CPU 201, while an EEPROM 203 stores, for example, the call codes (system ID) of the present exchange system. A RAM 204 stores various data required for the control of the CPU 201 and provides work areas therefor for various operations.

A channel codec 205 executes a process such as scrambling on the control signal and a time-shared multiplexing into a predetermined frame, under the control of the CPU 201. A radio unit 206 sends, to an antenna, the framed digital signal from the channel codec 205 by modulation for wireless transmission and demodulates the signal received by the antenna into a framed digital signal.

[Configuration of Wireless Adapter]

FIG. 3 is a block diagram showing the configuration of a wireless adapter 402 to be connected to a data terminal 103.

A radio unit 403 executes wireless communication with another wireless adapter. A main control unit 404 is composed of a CPU, peripheral devices for interruption control and DMA control, a system clock oscillator, etc., and controls the blocks in the wireless adapter 402.

A memory 405 is composed, for example, of a ROM for storing the programs to be used by the main control unit 404 and a RAM to be used as a buffer area for various processings.

A communication interface (I/F) unit 406 is connected to a communication interface such as RS232C, Centronics or LAN normally provided in the data terminal represented by the above-mentioned data terminal 103, or to an internal bus such as ISA bus or PCMCIA I/F of a personal computer or a work station.

A terminal control unit 407 executes various communication controls required in the data communication between the data terminal 103 and the wireless adapter 402 through the communication interface 406.

A channel codec 408 is composed of a frame process unit and a radio control unit, and data constructed as a frame in the channel codec 408 are transmitted to the concentrated control station 101 or a partner terminal 103 through a radio unit 403.

A control data generating unit 409 generates control data such as a communication request, and a control data analyzing unit 410 analyzes the received control data. An HP (hopping pattern) control managing unit 411 manages the hopping pattern used in the control data and the communication data, and a data transmission control unit 412 controls the data transmission by the received control data.

[Wireless Frame]

In FIGS. 4A to 4H, (1) to (8) indicate the configurations of a wireless frame to be used in the present system. In the following, there will be given a detailed explanation on the internal data constituting such frame.

Figure 4A:
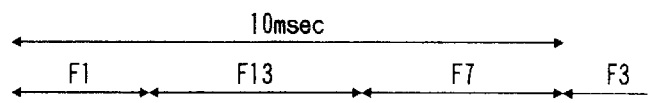
FIGS. 4A, 4B, 4C, 4D, 4E, 4F, 4G and 4H are views showing the configuration of wireless frames in the embodiment of the present invention.

In FIG. 4A, (1) indicates the structure of the entire frame, wherein CNT indicates a system control channel, and LCCH indicates a logic control channel. Voice communication is achieved by two channels, respectively assigned to both directions. A data channel is used for data transmission, and END indicates a frequency switching time for the next frame. F1, F3, etc. shown in this chart indicate the frequency channels to be used in the wireless transmission of this frame and indicate that the frequency channel is changed for each frame.

Figure 4B:

In FIG. 4B, (2) indicates the structure of the system control channel, wherein provided are a carrier sense time CS of a 12.8 μsec, a frame synchronization signal SYN of 1 dummy bit+31 bits, and an ID of a call signal of 63 bits+1 dummy bit.

There are also provided a basic frame number information BF (1 to 20 being cyclically changed) of 8 bits, a multi frame number information NF (1 to 16 cyclically changed) of 8 bits, a field WA in which recorded is the system address of a terminal to be awakened among those in the sleep mode, an area number Rev for distinction from the neighboring cell, a field CRC for CRC error detection, and a guard time GT. This channel is transmitted from the concentrated control station for the synchronization and control of the entire system.

Figure 4C:
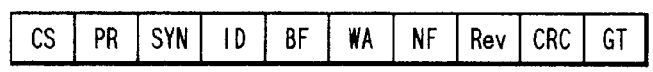

In FIG. 4C, (3) indicates the structure of the logic control channel, wherein provided are carrier sense time slots CS0, CS1, CS2 which can be prioritized according to the purpose of use. There are also provided a preamble PR of 56 bits for fetching the bit synchronization, a unique word UW of 24 bits for fetching the bite synchronization, and a field DA for storing the system address. Each terminal receives the channel having the system address same as that of the terminal.

There are further provided a data slot DATA for storing the logic control data, a field CRC for storing the CRC information for the data, and a guard time CF for frequency switching. The logic control channel is transmitted with the same frequency as that of the frame synchronization signal channel, and is used, for example, for a call setting in each terminal.

The logic control channel is transmitted with a hopping pattern which is common within the system.

Figure 4D:
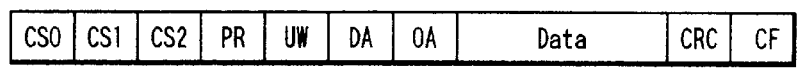

In FIG. 4D, (4) indicates the structure of the data channel, wherein provided are a guard time CF for frequency switching, and carrier sense time slots CS0, CS1, CS2 which can be prioritized according the purpose of use. There are also provided a preamble PR of 56 bits for fetching the bit synchronization, a unique word UW of 24 bits or fetching the bite synchronization, and a field DA for storing the system address. Each terminal receives the channel having the system address same as that of the terminal.

A field OA stores the address of the transmitting terminal. When the call setting is completed and a hopping pattern (for example, shift code 6) is assigned by the concentrated control station, the data are transmitted by hopping the frequency according to the assigned hopping pattern (for example, from F1 to F7) during this frame.

Figure 4E:
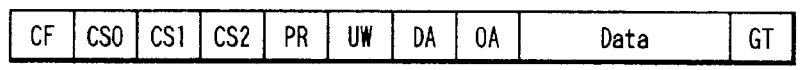

In FIG. 4E, (5) indicates the structure of the data, in which provided an ID CMD indicating that this frame is for data transmission, a packet number NUM, an effective data length LNG, and a flag FLG indicating whether the re-transmission is possible.

Figure 4F:
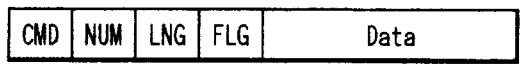

In FIG. 4F, (6) indicates the structure of the control data frame, wherein CMD indicates the kind of the control data of this frame. This frame is incorporated in the data slot of the logic control channel frame.

Figure 4G:
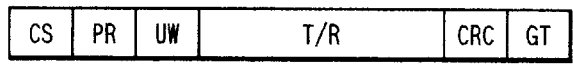

In FIG. 4G, (7) indicates the structure of the voice channel, wherein provided are a carrier sense time CS of 12.8 μsec, a preamble PR of 56 bits for fetching the bit synchronization, a unique word UW of 24 bits for fetching the byte synchronization, a B channel information T/R of 32 kbps, a field CRC indicating the CRC information for the data, and a guard time GT. In the communication of the voice data, another hopping pattern (for example, a shift code 12) is received from the concentrated control station and the voice data are transmitted by hopping the frequency according to the assigned hopping pattern (for example, from F1 to F13) only during this frame.

Figure 4H:

In FIG. 4H, (8) indicates the structure of the END frame, wherein CF indicates a guard time for frequency switching.

[Detailed Operations]

Figure 9:
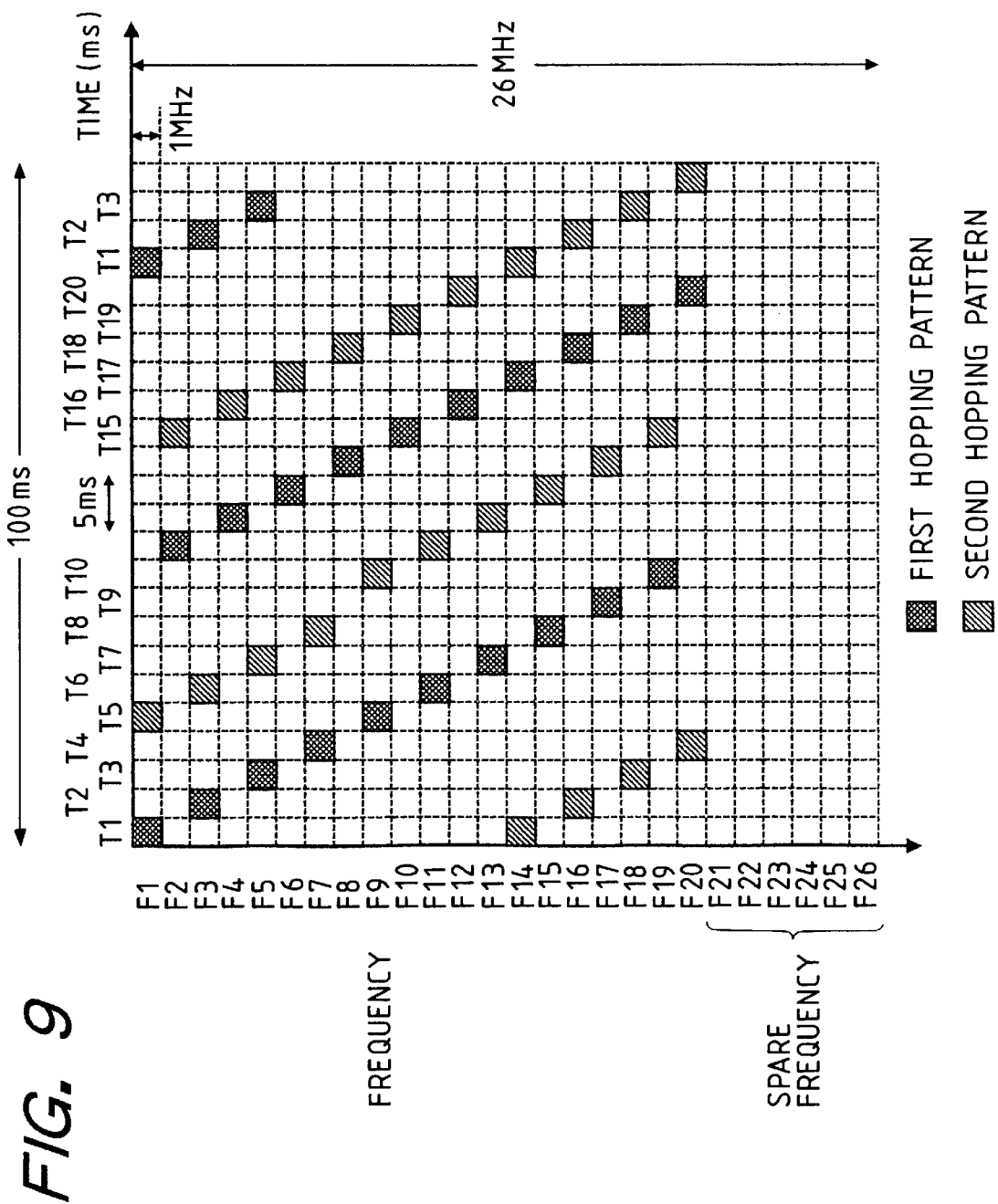
FIG. 9 is a view showing an example of the hopping pattern (HP) in a system embodying the present invention.

In the present system, as explained in the foregoing, the frame is constructed between the concentrated control station or the wireless telephone unit or the data terminal or between the terminal, and the used frequency is switched at a predetermined interval as shown in FIG. 9.

FIG. 9 shows an example of the frequency switching of the frequency hopping method.

In the following description, the wireless telephone units and the data terminals are collectively called communication terminals.

In the following, the functions of the present system will be explained in certain cases.

[Transmission Process Between the Communication Terminals]

Figure 5:
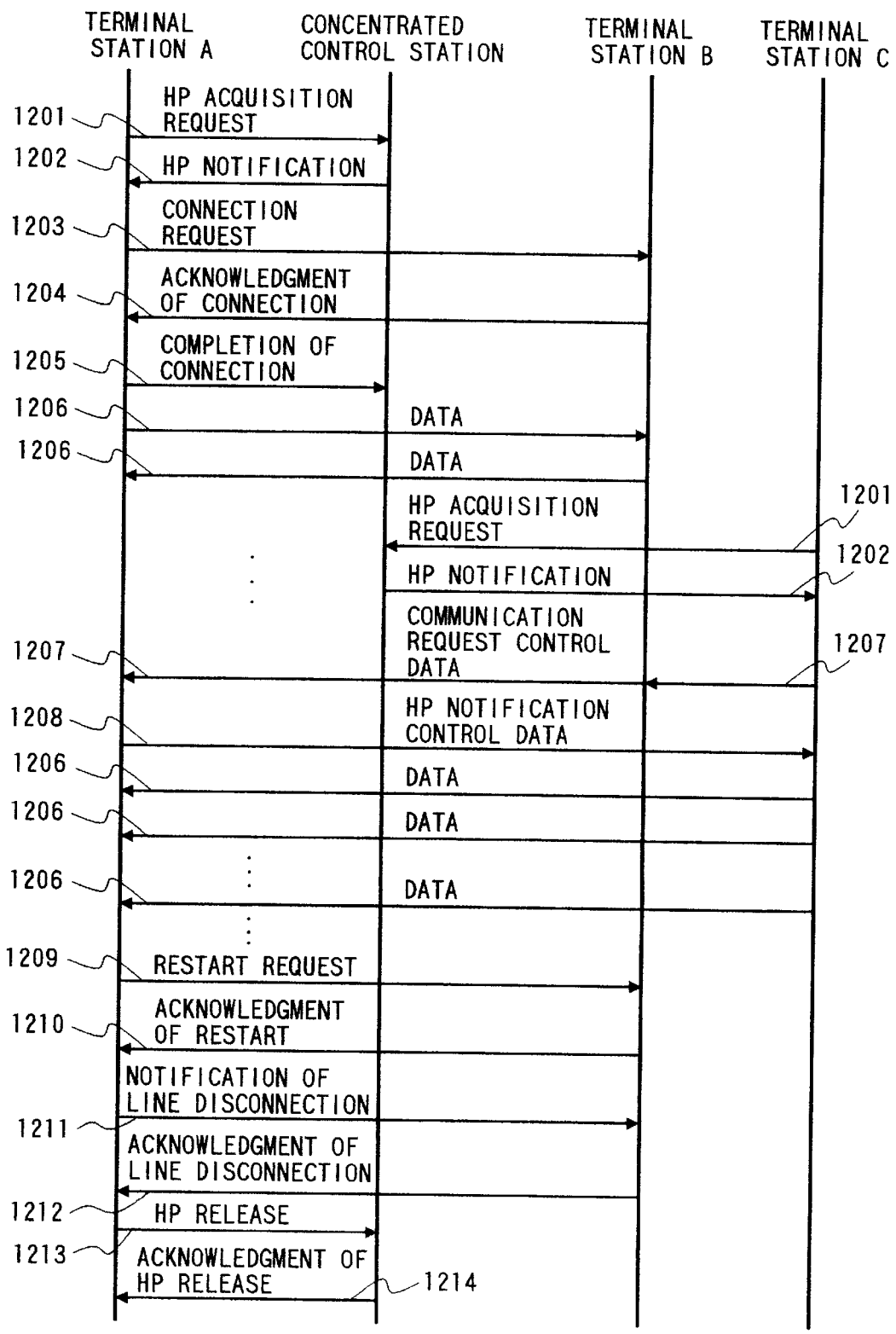
FIG. 5 is a sequence chart showing the data communicating operations in a first embodiment of the present invention.

FIG. 5 is a sequence chart showing the data communicating operation in the present embodiment.

Referring to FIG. 5, an HP acquisition request 1201 is originated by the transmitting communication terminal in order to receive the hopping pattern, to be used at the data transmission, from the concentrated control station, and an HP notice 1202 is a notification from the concentrated control station, in response to the HP acquisition request 1201, for providing the transmitting communication terminal with the hopping pattern.

A connection request 1203 is originated by the transmitting communication terminal for informing a receiving communication terminal of a communication request, and a connection confirmation 1204 is to inform the transmitting communication terminal of a state that the connection request has been accepted. A connection completion message 1205 is to inform the concentrated control station of a state that the call setting has been completed and the communication is to be started.

Data 1206 are ordinary data mutually transmitted from the transmitting communication terminal and the receiving communication terminal, and communication request control data 1207 are control data used in case of cut-in communication by interruption. Also, HP notification control data 1208 are used for informing the interrupting terminal of the hopping pattern of the data communication.

A re-start request 1209 is control data for re-starting the interrupted communication, and a re-start confirmation 1210 is control data for informing that the re-start request has been accepted.

A line disconnection notice 1211 is a notification of the termination of the data communication from the transmitting communication terminal to the receiving communication terminal, and a line disconnection confirmation 1212 is a notification that the line disconnection notice 1211 has been accepted, from the receiving communication terminal to the transmitting communication terminal.

An HP release message 1213 is to inform the concentrated control station of a state that the transmitting communication terminal has completed the communication and releases the hopping patterns that has been used, and an HP release confirmation 1214 is a message, from the concentrated control station to the transmitting communication terminal, that the HP release message has been accepted.

The above-mentioned signals 1201 to 1205 and 1207 to 1214 are transmitted in the logic control channel, while the data 1206 are transmitted in the data channel, and the control data 1207, 1208 are transmitted in the format of the control data frame.

Figure 6:
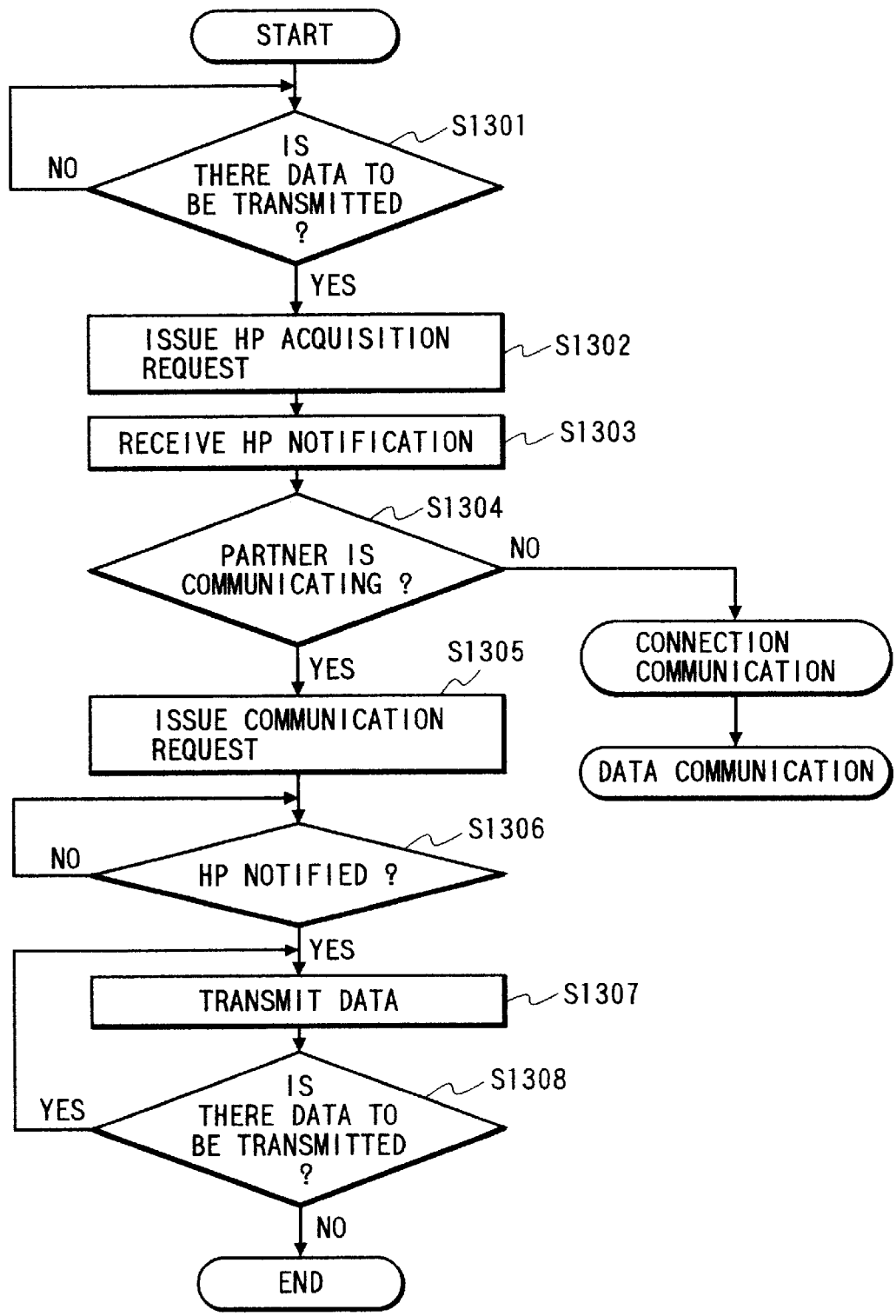
FIG. 6 is a flow chart showing the interruption data transmitting operation of a communication terminal in the above-mentioned embodiment of the present invention.
Figure 7:
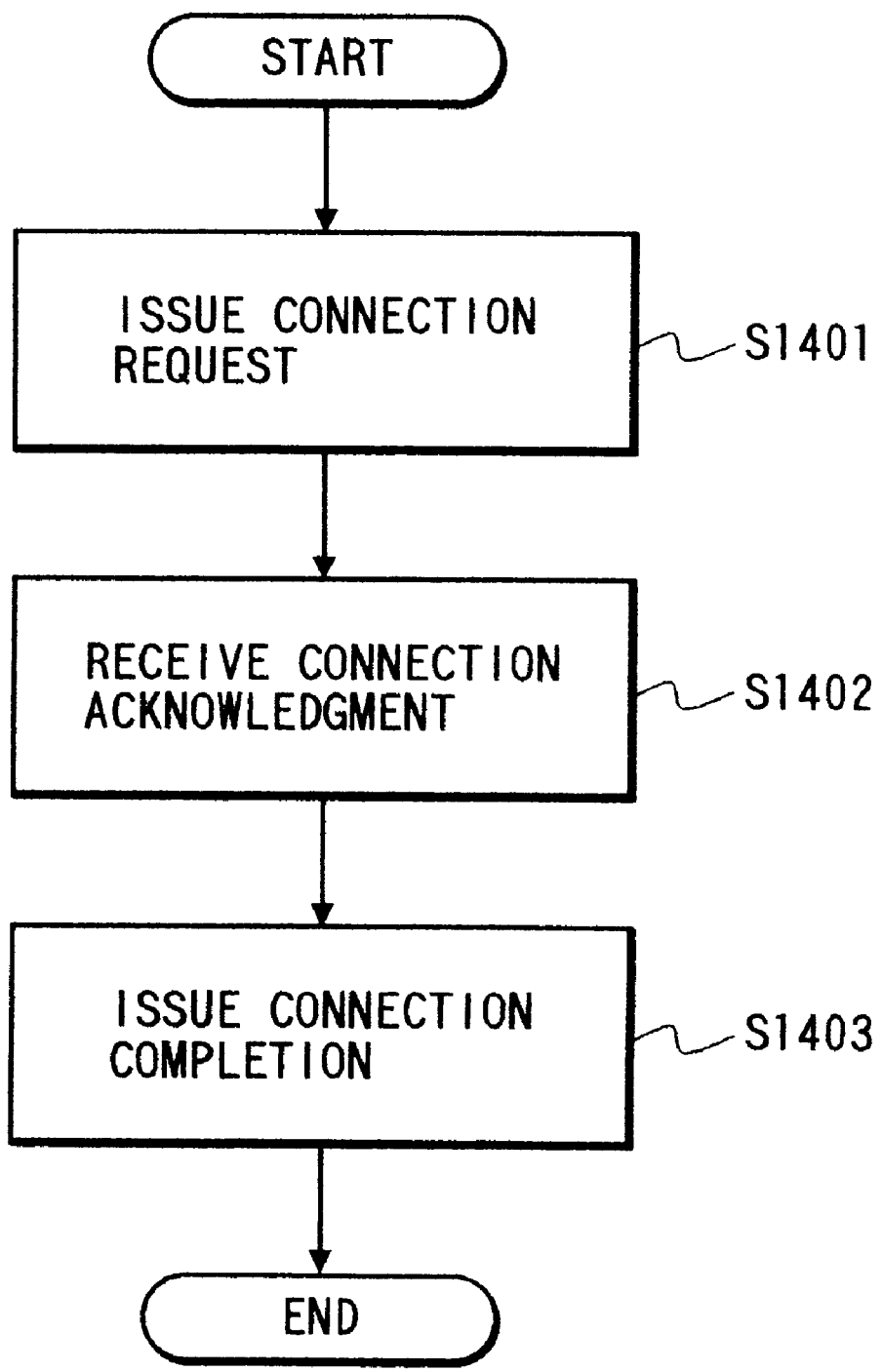
FIG. 7 is a flow chart showing the operation of a wireless terminal in the connected state in the data communication of the above-mentioned embodiment of the present invention.
Figure 8:
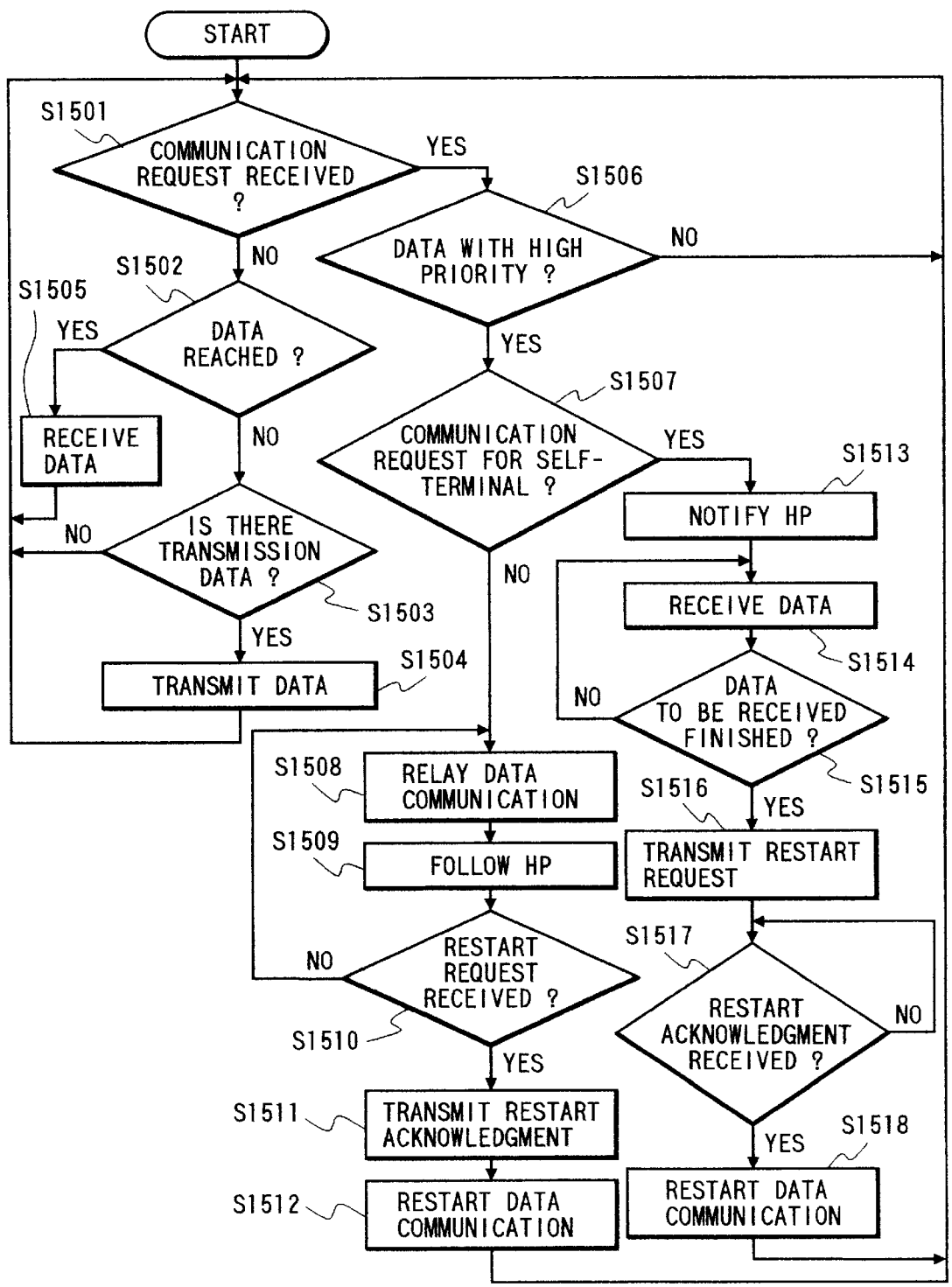
FIG. 8 is a flow chart showing the data communication operation of a communication terminal in a first embodiment of the present invention.

FIG. 6 is a flow chart showing the interrupting data transmitting operation, executed by the CPU of the control unit of the communication terminal of the present embodiment according to the program stored in the ROM; FIG. 7 is a flow chart showing the function executed by the CPU of the control unit of the communication terminal at the connecting operation in the data communication of the present embodiment according to the program stored in the ROM; and FIG. 8 is a flow chart showing the data communicating operation executed by the CPU of the control unit of the communication terminal of the present embodiment according to the program stored in the ROM.

At first, there will be explained the operations at the data transmission, with reference to FIG. 6. If there exist data to be transmitted (S1301), the HP acquisition request 1201 is transmitted to the concentrated control station 101 (S1302). In this state, the partner to which the communication is to be made is informed to the concentrated control station 101. The concentrated control station 101 informs the hopping pattern to be used and incorporates, in the HP notice 1202, information whether such partner terminal of the communication is currently in communication.

When the HP notice 1202 is received (S1303), there is discriminated whether the partner terminal of communication is currently in communication (S1304). If not, there is executed a connecting communication shown in FIG. 7, and the data communication is executed.

On the other hand, if the partner terminal of communication is currently in communication, such partner terminal of communication is caused to release the communication request control data 1207 (S1305). When the HP notice control data 1208, informing the HP used by the partner terminal, are received by the logic control channel from the partner terminal (S1306), the transmitting terminal is caused to execute the data transmission with the informed HP (S1307). When the transmission data are exhausted (S1308), the sequence is terminated.

In the following, there will be explained the connecting communication with reference to FIG. 7. At first, the connection request 1203 is transmitted to the receiving communication (S1401). Upon receiving the connection request 1203, the receiving communication terminal sends, to the transmitting communication terminal, the connection confirmation 1204 indicating the reception of the connection request. Upon receiving the connection confirmation (S1402), the transmitting communication terminal sends the connection completion message 1205 to the concentrated control station 101, thereby completing the call connection (S1403).

The data communication is executed upon completion of the call connection.

In the following, there will be explained the data communicating operation with reference to FIG. 8.

After the connection is completed as explained above, when the communication request control data are received (S1501), such control data are checked, and, if they are of a high priority for reception (S1506), there is discriminated whether the communication request control data 1207 are addressed to the self terminal (S1507).

If the communication request control data 1207 are addressed to the self terminal, the HP used in the current data communication is notified, by the HP notice control data 1208, to the communication terminal which has transmitted the communication request control data 1207 (S1513), and there are received data from the communication terminal which has transmitted the communication request control data 1207 (S1514).

When the data to be received are exhausted (S1515), the re-start request 1209 is transmitted to the partner communication terminal of the interrupted original communication (S1516), and, upon reception of the re-start confirmation 1210 from such partner terminal of the original communication (S1517), the data communication is re-started (S1518).

On the other hand, if the step S1507 identifies that the communication request control data 1207 are not addressed to the self communication terminal, the data communication is interrupted (S1508) but the frequency is changed according to the hopping pattern of the original data communication (S1509).

When the transmission data from the communication terminal which has transmitted the communication request control data 1207 are exhausted and the re-start request 1209 is received from the partner terminal of the original communication (S1510), the re-start confirmation 1210 is transmitted (S1511) and the data communication is re-started (S1512).

If the step S1501 identifies the absence of reception of the communication request control data 1207, upon arrival of the data (S1502), there is executed data reception (S1503). If the data are not received but there exist transmission data (S1503), there is executed the data transmission (S1504).

As explained in the foregoing, if, in the course of communication between two terminals A, B, for example, with a hopping pattern HP1 shown in FIG. 9, a terminal C wishes to communicate with the terminal A, the terminal C wishes to send the communication request to the terminals A and B, whereupon the terminal A informs the terminal C of the hopping pattern HP1 used in the communication with the terminal B while the terminal B relays the communication with the terminal A.

However, the terminal B follows the hopping pattern HP1 thereby being capable of re-starting the communication with the terminal A at any time.

When the communication between the terminals A and C is terminated, the terminal A re-starts the communication with the terminal B utilizing the hopping pattern HP1 used in the communication with the terminal C, and the terminal B re-starts the communication with the terminal A utilizing the hopping pattern HP1 which has been followed by the terminal B.

In this manner, even during the communication between two terminals, another terminal can communicate with either of these two terminals by interrupting the current communication.

Also, the communication terminal which is not the object of the communication request does not hinder the communication with the interrupting terminal, and the original communication can be re-started without complex control. Also, the interrupting communication from another terminal or the re-start of the communication with the original terminal can be achieved without new call setting, thereby ensuring efficient communication.

Second Embodiment

In the first embodiment, the re-start of the communication is achieved by the transmission of a re-start request, but, in the second embodiment, the terminal which is following the hopping pattern because of the interrupting communication always monitors the address of the data of the interrupting communication, and re-starts the communication when data addressed to such monitoring terminal are received.

The configurations of the system and the components are the same as those in the first embodiment and will not, therefore, be explained further.

Figure 10:
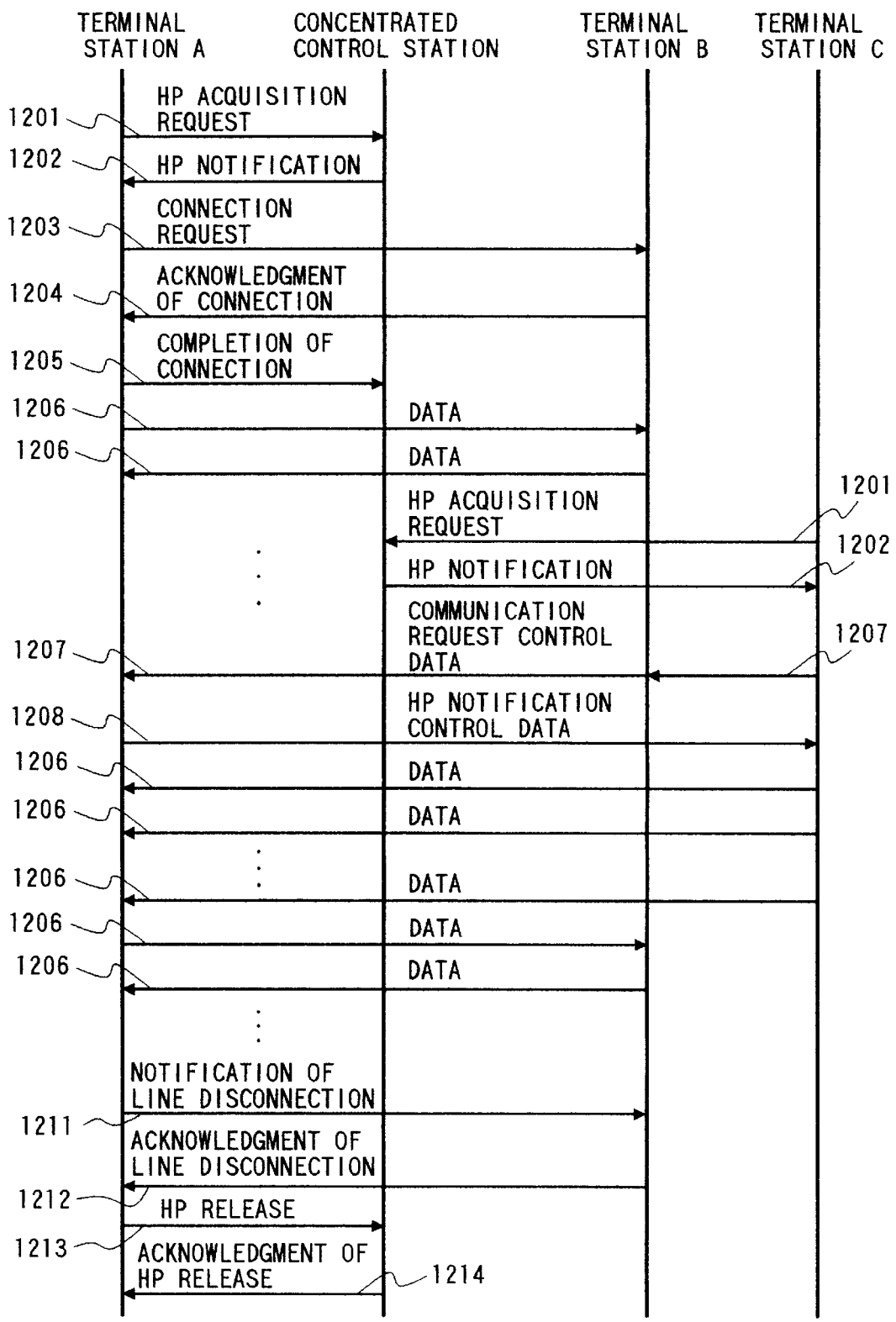
FIG. 10 is a sequence chart showing the data communicating operation in a second embodiment of the present invention.

FIG. 10 is a sequence chart showing the data communicating operation executed by the CPU of the communication terminal according to the program stored in the ROM.

Referring to FIG. 10, an HP acquisition request 1201 is emitted by the transmitting communication terminal in order to receive the hopping pattern, to be used at the data transmission, from the concentrated control station, and an HP notice 1202 is a notification from the concentrated control station, in response to the HP acquisition request 1201, for providing the transmitting communication terminal with the hopping pattern.

A connection request 1203 is originated by the transmitting communication terminal for informing the receiving communication terminal of the reception of a communication request, and a connection confirmation 1204 is to inform the transmitting communication terminal of a state that the connection request has been accepted by the receiving communication terminal. A connection completion message 1205 is to inform the concentrated control station of a state that the call setting has been completed and the communication is to be started.

Data 1206 are ordinary data mutually transmitted from the transmitting communication terminal and the receiving communication terminal, and communication request control data 1207 are control data used in case of cut-in communication by interruption. Also, HP notification control data 1208 are used for informing the interrupting terminal of the hopping pattern of the data communication.

A line disconnection notice 1211 is originated by the transmitting communication terminal for informing the receiving communication terminal of the termination of the data communication, and a line disconnection confirmation 1212 is emitted by the receiving communication terminal for informing the transmitting communication terminal of the reception of the line disconnection notice.

An HP release notice 1213 is originated by the transmitting communication terminal for informing the receiving communication terminal of the release of the HP that has been used, and an HP release confirmation 1214 is originated by the concentrated control station for informing the transmitting communication terminal of the reception of the HP release notice.

The above-mentioned signals 1201 to 1205 and 1207 to 1212 are transmitted in the logic control channel, while the data 1206 are transmitted in the data channel, and the control data 1207, 1208 are transmitted in the format of the control data frame.

Figure 11:
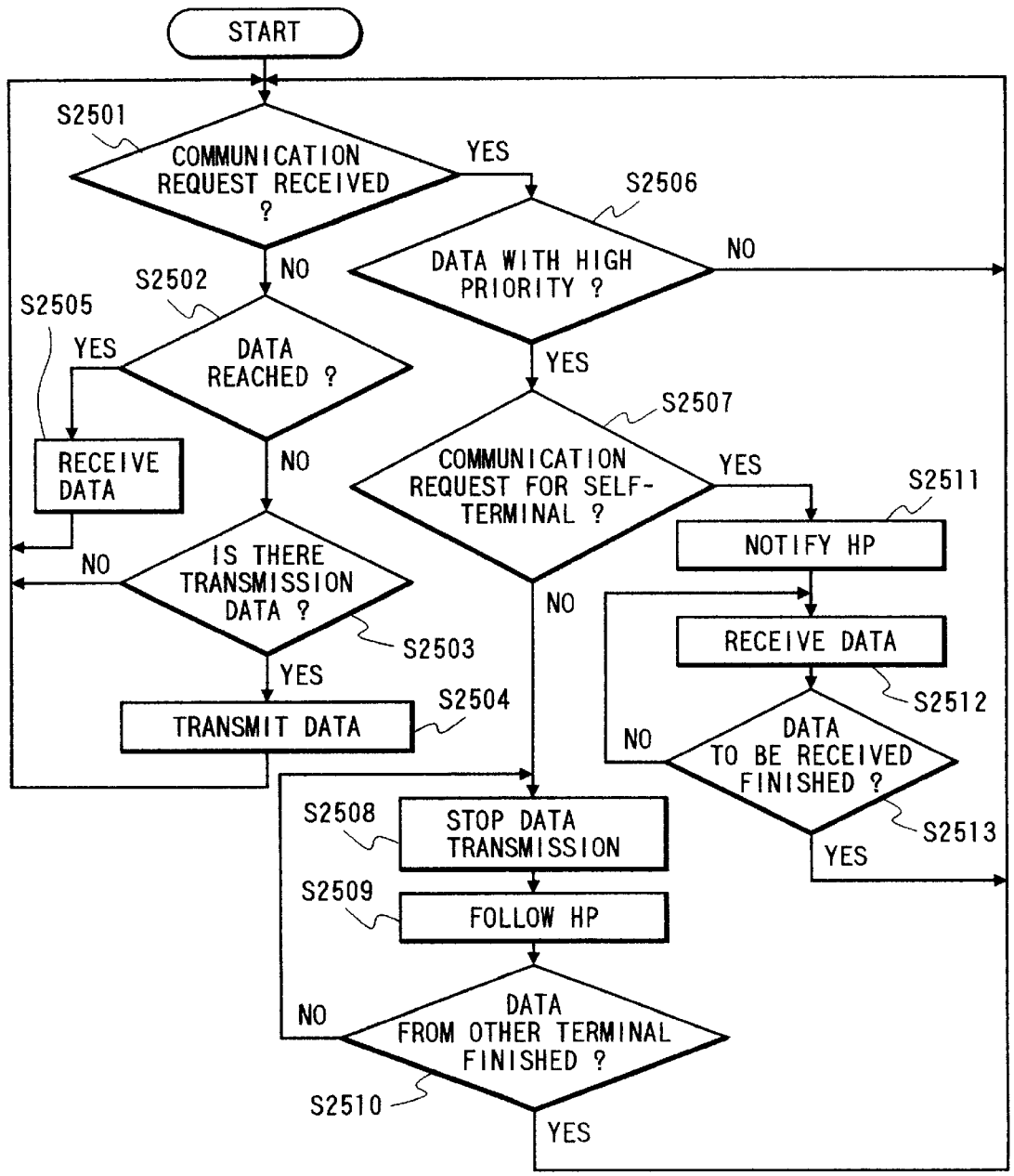
FIG. 11 is a flow chart showing the data communicating operation of a communication terminal in the second embodiment of the present invention.

The interrupting data transmitting operation and the connecting operation of the present embodiment, executed by the CPU of the communication terminal of the present embodiment according to the program stored in the ROM, are similar to those in the first embodiment and will not, therefore, be explained again. FIG. 11 is a flow chart showing the data communicating operation of the present embodiment, executed by the CPU of the communication terminal of the present embodiment according to the program stored in the ROM.

In the following, there will be explained the data communicating operation, with reference to FIG. 11.

If the communication request control data are received after the completion of connection and in the course of communication (S2501), such control data are checked, and, if they are of a high priority for reception (S2506), there is discriminated whether the communication request control data 1207 are addressed to the self terminal (S2507).

If the communication request control data 1207 are addressed to the self terminal, the HP used in the current data communication is notified, by the HP notice control data 1208, to the communication terminal which has transmitted the communication request control data 1207 (S2511), and data are received with such HP (S1512).

When the data to be received are exhausted (S1513), the communication is restored with the original communication terminal.

If there are data to be transmitted (S2503), such data are transmitted (S2504), and, if data are transmitted from the communication terminal whose communication has been interrupted (S2502), such data are received (S2505).

On the other hand, if the step S2507 identifies that the communication request control data 1207 are not addressed to the self communication terminal, the data communication is interrupted (S2508) but the frequency is changed according to the hopping pattern of the original data communication (S2509).

When a predetermined period elapses after the exhaustion of the transmission data from the communication terminal which has transmitted the communication request control data 1207 (S2510), the original communication is re-started.

If the step S2501 identifies the absence of the reception of the communication request control data 1207, upon arrival of the data (S2502), there is executed data reception (S2503). If the data are not received but there exist transmission data (S2503), there is executed the data transmission (S2504).

As explained in the foregoing, even in the course of communication between two terminals, another terminal can cut into such communication by interruption.

Also, the communication terminal which is not the object of the communication request does not hinder the communication with the interrupting terminal, and the original communication can be re-started. Also the interrupting communication from another terminal or the re-start of the communication with the original terminal can be achieved without new call setting, thereby ensuring efficient communication.

In the above-explained embodiment, in the course of communication of the interrupting communication terminal, other communication terminals do not transmit data, but such other communication terminals may execute mutual data transmission, for example, by CSMA/CA (carrier sensing multiplex addressing/collision avoiding). In such case, the receiving communication terminal identifies the transmitting communication terminal of the data by referring to the transmitting address.

As explained in the foregoing, the present invention, enabling an interrupting communication by another terminal even in the course of communication of the plural terminals, allows to construct an effective system particularly for an emergency.

Also, among the terminals involved in the original communication, the communication terminal which is not the object of the communication request does not hinder the communication with the interrupting terminal, and the original communication can be re-started afterwards.

What is claimed is:

1. A communication system including a plurality of communication devices communicating by a frequency hopping method, comprising:

communication means for deciding on a first frequency hopping pattern used in a communication from among a plurality of frequency hopping patterns and for communicating by using the decided on first frequency hopping pattern;

detection means for, in a course of communication between first and second communication devices by using the first frequency hopping pattern, detecting predetermined control information representing that a third communication device requests to communicate with the first communication device; and control means for controlling so as to interrupt the communication between the first and second communication devices in response to the detection made by said detection means and to start a communication between the first and third communication devices, wherein said communication means communicates, in a case where the communication between the first and third communication devices is started, by using the frequency hopping pattern used in the communication between the first and second communication devices.

2. The system according to claim 1, wherein the predetermined control information is communicated with a second hopping pattern which is common among the first, second and third communication devices in said communication system.

3. The system according to claim 1, wherein said control means controls in accordance with a priority of the predetermined control information.

4. The system according to claim 1, wherein the second communication device switches the frequency following the first hopping pattern even if the communication with the first communication device is interrupted.

5. The system according to claim 4, wherein the second communication device re-starts the communication with the first communication device by using the first hopping pattern that has been followed, upon the termination of the communication between the first and third communication devices.

6. The system according to claim 5, wherein the first communication device transmits to the second communication device a request to re-start the communication, upon the termination of the communication with the third communication device.

7. The system according to claim 5, wherein said communication device monitors the communication between the first and third communication devices and re-starts the communication between the first and second communication devices when the second communication device discriminates the termination of the communication between the first and third communication devices.

8. The system according to claim 1, wherein the third communication device simultaneously transmits the predetermined control information to at least the first and second communication devices.

9. A first communication device for communicating by a frequency hopping method, comprising:

communication means for deciding on a first frequency hopping pattern used in a communication from among a plurality of frequency hopping patterns and for communicating by using the decided on first frequency hopping pattern;

detection means for, in a course of a communication with a second communication device by using the first frequency hopping pattern, detecting predetermined control information representing that a third communication device requests a communication with said first communication device; and control means for controlling so as to interrupt the communication with the second communication device in response to the detection made by said detection means and to start the communication with the third communication device, wherein said communication means communicates, in a case where the communication with the third communication device is started, by using the first frequency hopping pattern used in the communication with the second communication device.

10. The communication device according to claim 9, wherein the predetermined control information is communicated with a second hopping pattern which is common among the first, second and third communication devices.

11. The communication device according to claim 9, wherein said control means controls in accordance with a priority of the predetermined control information.

12. The communication device according to claim 9, wherein said first communication device re-starts the communication with the second communication device by using the first hopping pattern, upon the termination of the communication with the third communication device.

13. The communication device according to claim 9, wherein said first communication device transmits information for requesting the re-start of the communication with the second communication device, upon the termination of the communication with the third communication device.

14. The communication device according to claim 9, wherein said first communication device re-starts the communication by transmitting the data to the second communication device, upon the termination of the communication with the third communication device.

15. The communication device according to claim 9, wherein the predetermined control information is simultaneously transmitted at least to said first communication device and the second communication device.

16. A first communication device for communicating by a frequency hopping method, comprising:

interruption means for, in a course of a communication with a second communication device by using a first hopping pattern, interrupting the communication with the second communication device when a third communication device requests communication with the second communication device; and switch means for continuously switching the frequency following the first hopping pattern so as to swiftly re-start the communication with the second communication device, when the communication with the second communication device is interrupted by said interruption means.

17. The communication device according to claim 16, wherein the interruption made by said interruption means is performed on the basis of predetermined control information communicated by using a second hopping pattern which is used in common among the first, second and third communication devices.

18. The communication device according to claim 17, wherein the interruption made by said interruption means is performed in accordance with a priority of the predetermined control information.

19. The communication device according to claim 16, wherein the communication with the second communication device is re-started upon the termination of the communication between the second and third communication devices.

20. The communication device according to claim 19, wherein the re-start of the communication with the second communication device is performed on the basis of the information for requesting a re-start of the communication which is transmitted by the second communication device.

21. The communication device according to claim 19, wherein said first communication device monitors the communication between the second and third communication devices and re-starts the communication with the second communication device when said first communication device discriminates the termination of the communication between the second and third communication devices.

22. A first communication device for communicating by a frequency hopping method, comprising:

communication means for deciding on a first frequency hopping pattern used in a communication from among a plurality of frequency hopping patterns and for communicating by using the decided on first frequency hopping pattern;

transmission means for, in a course of a communication between second and third communication devices by using a first frequency hopping pattern, transmitting predetermined control information for requesting the communication with the second communication device; and starter means for starting the communication with the second communication device, upon an interruption of the communication between the second and third communication device on the basis of the predetermined control information transmitted by said transmission means, wherein said starter means communicates, in a case where the communication with the second communication device is started, by using the first frequency hopping pattern used in the communication between the second and third communication devices.

23. The device according to claim 22, wherein the predetermined control information is communicated with a second hopping pattern which is common among the first, second and third communication devices.

24. The device according to claim 22, wherein the communication with the second communication device is performed in accordance with a priority of the predetermined control information transmitted from said transmission means.

25. The device according to claim 22, wherein said transmission means transmits the predetermined control information to at least the second and third communication devices.

26. A control method for a communication system including a plurality of communication devices communicating by a frequency hopping method, comprising:

a communication step for deciding on a first frequency hopping pattern used in a communication from among a plurality of frequency hopping patterns and for communicating by using the decided on hopping pattern;

a detection step for, in a course of a communication between first and second communication devices by using the first frequency hopping pattern, detecting predetermined control information representing that a third communication device requests a communication with the first communication device; and a control step for controlling so as to interrupt the communication between the first and second communication devices in response to the detection in said detection step and to start the communication between the first and third communication devices, wherein said communication step communicates, in a case where the communication between the first and third communication devices is started, by using the first frequency hopping pattern used in the communication between the first and second communication devices.

27. A control method for a first communication device communicating by a frequency hopping method, comprising:

a communication step for deciding on a first frequency hopping pattern used in a communication from among a plurality of frequency hopping patterns and for communicating by using the decided on hopping pattern;

a detection step for, in a course of communication with second communication device by using a first frequency hopping pattern, detecting predetermined control information representing that a third communication device requests a communication with the first communication device; and control step for controlling so as to interrupt the communication with the second communication device in response to the detection in said detection step and to start the communication with the third communication device, wherein the first communication device communicates in communication steps, in a case where the communication with the third communication is started, by using the first frequency hopping pattern used in the communication with the second communication device.

28. A control method for a first communication device communicating by a frequency hopping method, comprising:

an interruption step for, in a course of a communication with a second communication device by using a first hopping pattern, interrupting the communication with the second communication device when a third communication device requests communication with the second communication device; and a switching step for continuously switching the frequency following the first hopping pattern so as to swiftly re-start the communication with the second communication device, upon the interruption of the communication with the second communication device in said interruption step.

29. A control method for a first communication device communicating by a frequency hopping method, comprising:

a communication step for deciding on a first frequency hopping pattern used in a communication from among a plurality of frequency hopping patterns and for communicating by using the decided on hopping pattern;

a transmission step for, in a course of a communication between second and third communication devices by using the first frequency hopping pattern, transmitting predetermined control information for requesting a communication with the second communication device; and a start step for starting a communication with the second communication device, upon an interruption of the communication between the second and third communication devices on the basis of the predetermined control information transmitted in said transmission step, wherein the first communication device communicates in said starter step, in a case where the communication with the second communication device is started, by using the first frequency hopping pattern used in the communication between the second and third communication devices.

30. A program storage device readable by a machine, tangibly embodying a program of instructions executable by the machine to perform method steps for the communication by a first wireless communication device with a frequency hopping method, said method steps comprising:

a communication step for deciding on a first frequency hopping pattern used in a communication from among a plurality of frequency hopping patterns and for communicating by using the decided on hopping pattern;

a detection step for, in a course of communication with second communication device by using the first frequency hopping pattern, detecting predetermined control information representing that a third communication device requests a communication with the first communication device; and control step for controlling so as to interrupt the communication with the second communication device in response to the detection in said detection step and to start the communication with the third communication device, wherein said communication steps communicates, in a case where the communication with the third communication is started, by using the first frequency hopping pattern used in the communication with the second communication device.

31. A program storage device readable by a machine, tangibly embodying a program of instructions executable by the machine to perform method steps for a first communication device communicating by a frequency hopping method, said method steps comprising:

an interruption step for, in a course of a communication with a second communication device by using a first hopping pattern, interrupting the communication with the second communication device when a third communication device requests communication with the second communication device; and a switching step for continuously switching the frequency following the first hopping pattern so as to swiftly re-start the communication with the second communication device, upon the interruption of the communication with the second communication device in said interruption step.

32. A program storage device readable by a machine, tangibly embodying a program of instructions executable by the machine to perform method steps for a first communication device communicating by a frequency hopping method, said method steps comprising:

a communication step for deciding on a first frequency hopping pattern used in a communication from among a plurality of frequency hopping patterns and for communicating by using the decided on hopping pattern;

a transmission step for, in a course of a communication between second and third communication devices by using the first frequency hopping pattern, transmitting predetermined control information for requesting a communication with the second communication device; and a start step for starting a communication with the second communication device, upon an interruption of the communication between the second and third communication devices on the basis of the predetermined control information transmitted in said transmission step, wherein the first communication device communicates in said start step, in a case where the communication with the second communication device is started, by using the first frequency hopping pattern used in the communication between the second and third communication devices.

33. A communication system including a plurality of communication devices, comprising:

communication means for deciding on a first communication channel used in a communication from among a plurality of communication channels and for communicating by using the decided on communication channel;

detection means for, in a course of communication between first and second communication devices by using the first communication channel, detecting a predetermined control information representing that a third communication device requests a communication with the first communication device; and control means for controlling so as to interrupt the communication with the first and second communication devices in response to the detection made by said detection means and to start the communication between the first and third communication devices, wherein said communication means, in a case where the communication between the first and third communication devices is started, does not select a new communication channel and communicates by using the first communication channel used in the communication between the first and second communication devices.

34. A first communication device, comprising:

communication means for deciding on a first communication channel used in a communication from among a plurality of communication channels and for communicating by using the decided on communication channel;

detection means for, in a course of the communication with a second communication device by using the first communication channel, detecting a predetermined control information indicating that a third communication device requests a communication with the first communication device; and control means for controlling so as to interrupt the communication with the second communication device in response to the detection made by said detection means and to start the communication with the third communication device, wherein said communication means, in a case where the communication with the third communication device is started, does not select a new communication channel and communicates by using the first communication channel used in the same communication with the second communication device.

35. A first communication device, comprising:

interruption means for, in a course of a communication with a second communication device, interrupting the communication with the second communication device when a third communication device requests communication with the second communication device; and monitor means for monitoring a communication channel used in the communication between the second and third communication devices so as to swiftly re-start the communication with the second communication device, upon the interruption of the communication with the second communication device made by said interruption means.

36. A first communication device, comprising:

communication means for deciding on a communication channel used in a communication from among a plurality of communication channels and for communicating by using the decided on communication channel;

transmission means for, in a course of a communication between second and third communication devices by using the first communication channel, transmitting predetermined control information for requesting the communication with the second communication device; and start means for starting the communication with the second communication device, upon an interruption of the communication between the second and third communication devices on the basis of the predetermined control information transmitted by said transmission means, wherein said start means communicates, in a case where the communication with the second communication device is started, by using the first communication channel used in the communication between the second and third communication devices without deciding on a new communication channel.

* * * * *

UNITED STATES PATENT AND TRADEMARK OFFICE
CERTIFICATE OF CORRECTION

PATENT NO.   : 6,567,458 B1
DATED        : May 20, 2003
INVENTOR(S)  : Naoto Kagaya It is certified that error appears in the above-identified patent and that said Letters Patent is hereby corrected as shown below:

<u>Column 3,</u>
Line 20, "concentrate d" should read -- concentrated --.

<u>Column 4,</u>
Line 54, "according" should read -- according to --.

<u>Column 6,</u>
Line 9, "patterns" should read -- pattern --.

<u>Column 14,</u>
Line 33, "steps" should read -- step --.

Signed and Sealed this

Eleventh Day of November, 2003

JAMES E. ROGAN
*Director of the United States Patent and Trademark Office*